UNITED STATES PATENT OFFICE.

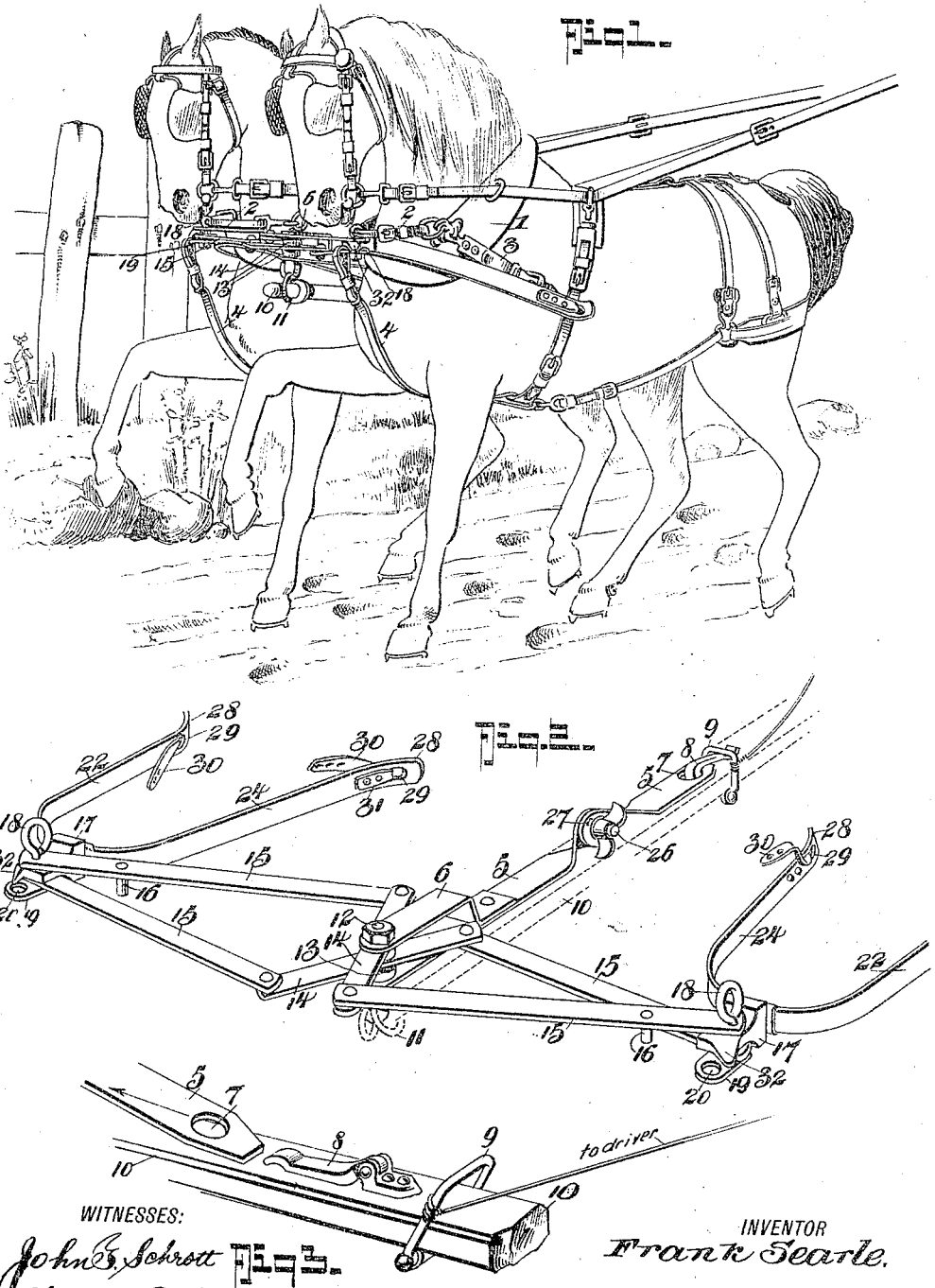

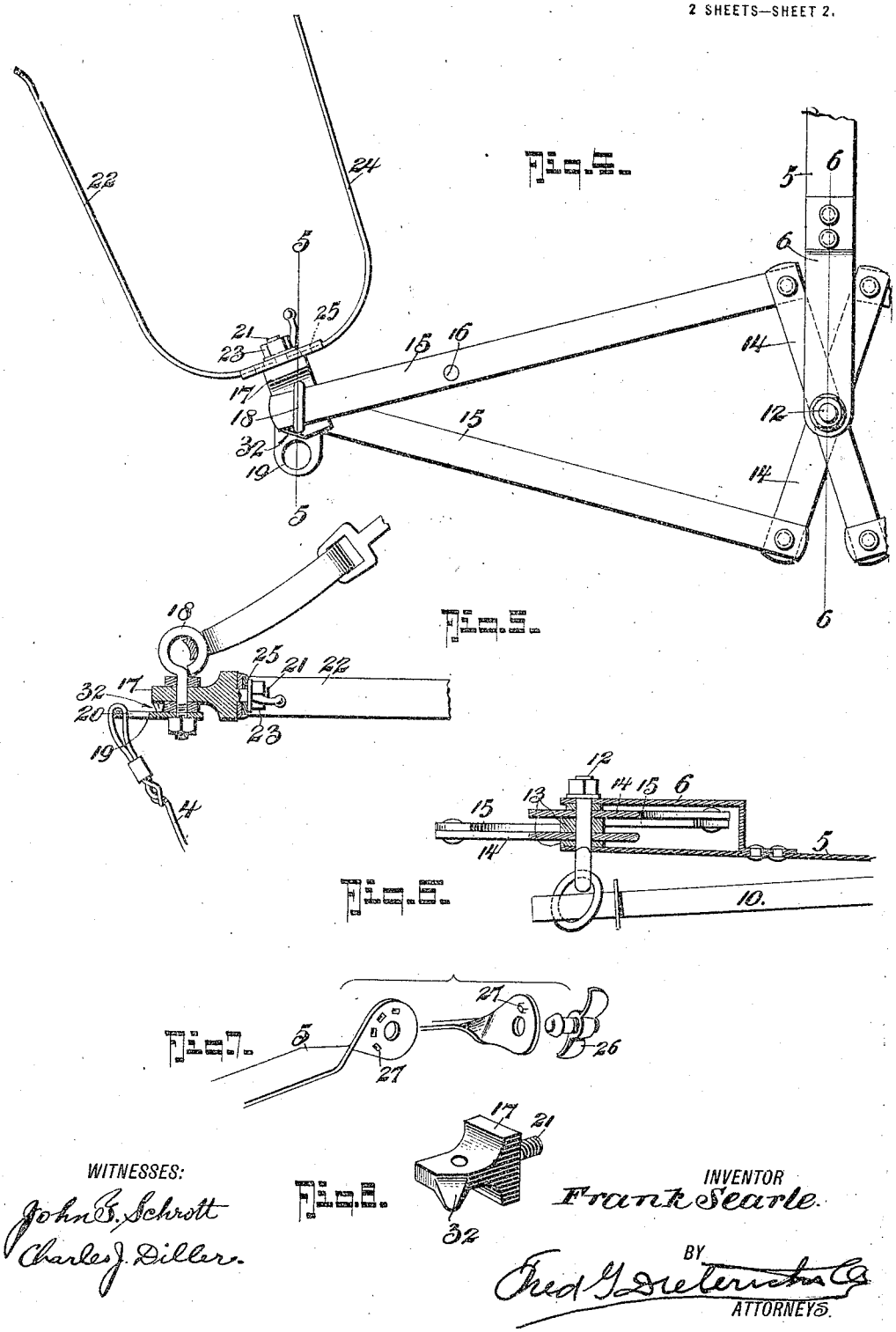

FRANK SEARLE, OF ENNIS, MONTANA.

HARNESS.

1,161,738.   Specification of Letters Patent.   Patented Nov. 23, 1915.

Application filed November 25, 1914. Serial No. 873,931.

*To all whom it may concern:*

Be it known that I, FRANK SEARLE, residing at Ennis, in the county of Madison and State of Montana, have invented certain new and useful Improvements in Harness, of which the following is a specification.

My invention relates to certain new and useful improvements in neck yoke harness for teams and in its generic nature the invention has for its object to provide a connection for use in lieu of the ordinary neck yoke, which connection is of the lazy-tongs type, whereby the horses can move toward and from each other, and whereby the use of long tugs, whiffle trees and the like are eliminated.

The invention also has for its object to provide a means whereby the horses may be quickly detached from the draft tongue of the vehicle by the driver.

Again, the invention has for its object to provide a harness which can be used not only in connection with draft vehicles but can be used in logging, plowing and other farm work, and in road making.

In its more subordinate nature, the invention provides a pair of bows to extend around the breasts of the horses and be supported by the neck yoke straps and a short tug connection with the collar, the bows being pivotally mounted on the extremities of a lazy-tongs connection, that is also pivoted to a draft bar which is adapted for connection to the end of the tongue of a vehicle or to which the logging chain or other draft connection may be secured.

In its still more subordinate nature, the invention resides in those novel details of construction, combination and arrangement of parts, all of which will be first fully described, then be specifically pointed out in the appended claims and illustrated in the accompanying drawings, in which:

Figure 1 is a perspective view illustrating the invention in use. Fig. 2 is a perspective view of the invention, *per se*, showing a portion of the vehicle tongue in dotted lines and the quick releasing finger link connection. Fig. 3 is an enlarged detail perspective view of the quick release finger link connection. Fig. 4 is an enlarged plan view of substantially one-half of the neck yoke connection and showing the manner in which the bows may be turned out, the turning out movement being limited by a stop. Fig. 5 is a cross section on the line 5—5 on Fig. 4. Fig. 6 is a cross section on the line 6—6 on Fig. 4. Fig. 7 is a perspective view showing the two parts of the draft bar separated. Fig. 8 is a detail perspective view of the pivot block.

In the drawings, in which like numerals and letters of reference indicate like parts in all of the figures. 1 is the collar portion of the ordinary double team harness, 2, the upper neck yoke straps, 3, the short lugs, and 4, the lower yoke or breast straps. All of the foregoing parts may be of the ordinary construction and *per se*, form no part of the invention.

My invention comprises a draft bar 5 to which a bridge 6 is secured to form a bifurcation in which the pivot 12 is held.

The draft bar 5 has a hole 7 in its rear end, through which a finger link 8, that is pivotally secured to the draft tongue 10, may be passed, and when the invention is used in connection with a vehicle having a draft tongue, the link 8 may be held in its securing position by a bale 9 that is adapted to be released by a suitable pull cord that extends to the driver.

11 designates the tongue rings of which one or more may be carried by the eye bolt 12 to receive the end of the tongue. On the bolt 12, there is disposed spacing washers 13 and levers or links 14, the latter being pivoted on the bolt 12 and crossed. 15 are bars pivoted to the links 14 and extending to opposite sides of the draft bar 5 in pairs. Each pair of bars 15, at their outer extremities, are pivoted, by eye bolts 18, to bow blocks 17, the bow blocks 17 carrying the bows, hereinafter again referred to.

In order to prevent the bars 15 and 14 from being pulled into alinement, stops 16 are provided.

19 designate combined washers and eye members which are pivoted on the pivot bolts 18 and have eyes 20 to which the breast straps 4 are fastened.

The bow blocks 17 have threaded shanks 21 to receive the jam nuts 23, which latter may be of the wing type for facility of adjustment.

The bows are composed of two sections, the outer section 22 and the inner section 24, the sections being pivoted at 21 to the bow block 17, and are adjusted laterally to admit a large or smaller animal by bringing suitable ones of the apertures 25 in either member 24—22 into alinement with the end 21 where they are clamped and are also held rigid by the upper and lower flared edges of one of the members (see principally Figs. 4 and 5). The rear or free ends of both bars 22 and 24 are preferably outwardly extended, as at 28, and are provided with apertures 29 through which the short tug connections 30 are passed. One end of each of the tug connections 30 is preferably riveted at 31 to the respective bar 24 or 22, or connected thereto in any other suitable way.

32 designates stops on the bow blocks 17 which limit the outward movement of the bows, as shown in Fig. 4, to prevent undue separation of the horses.

The draft bar 5 and its carried parts are held at a suitable elevation by a thumb screw 26 and interlocked connection 27 (see Fig. 7).

In practice, the harness is supported as shown in Fig. 1, and when the horses are pulling forward, the draft is applied directly through the short tugs 3 to the bows 22—24, the power being transmitted from the bows through the lazy tongs connections 15—14 to the draft bar 5 to cause a movement of the same. When the horses are holding back, the straps 2—4 exert the necessary rearward pull on the neck yoke lazy-tongs connection 15—14 to "hold back" on the draft bar 5.

When it is desired to employ my invention in connection with logging ropes, the usual logging rope hook is hooked into the eye 7 and draft applied in that way.

From the foregoing description taken in connection with the accompanying drawings, it is thought the complete construction, operation and advantages of the invention will be clear to those skilled in the art.

What I claim is:—

1. In a harness, the combination with the draft bar and the harness bows adapted to be supported by the horses; of a lazy-tongs neck yoke connection between said bows and said draft bar so arranged that said bows may be moved laterally toward or from the draft bar and also back and forth in the direction of the draft bar, substantially as shown and described.

2. In combination with the draft bar and bows, a single lazy-tongs connection between said bows and the draft bar whereby said bows may be moved laterally in unison toward or from the draft bar, and stops carried by said lazy-tongs connection for restraining the separation of said bows.

3. In combination with the collar, the short tugs, the upper neck yoke straps and the lower breast-neck-yoke straps of a double team harness, bow members, short tug connections between said short tugs and the ends of said bow members, a bow block secured to each of said bow members, a draft bar, a single lazy-tongs connection between said bow blocks and said draft bar, and means for securing the upper neck yoke straps and the lower breast yoke straps to the aforesaid structure to sustain the same.

4. In combination with the collar, the short tug, the upper neck yoke straps and the lower breast-neck-yoke straps of a double team harness, bow members, short tug connections between said short tugs and the ends of said bow members, a bow block secured to each of said bow members, a draft bar, a single lazy-tongs connection between said bow blocks and said draft bar, means for securing the upper neck yoke straps and the lower breast yoke straps to the aforesaid structure to sustain the same, and means for securing said draft bar to the tongue of a vehicle.

5. In combination with the collar, the short tugs, the upper neck yoke straps and the lower breast-neck-yoke straps of a double team harness, bow members, short tug connections between said short tugs and the ends of said bow members, a bow block secured to each of said bow members, a draft bar, a single lazy-tongs connection between said bow blocks and said draft bar, means for securing the upper neck yoke straps and the lower breast yoke straps to the aforesaid structure to sustain the same, and means for releasably securing said draft bar to the tongue of a vehicle.

6. In an apparatus of the character described, a draft bar, a pair of bows at each side of said draft bar and a lazy-tongs connection between said bows and draft bar, said draft bar including a front member and a rearwardly extending member pivotally and adjustably secured to said front member.

7. In an apparatus of the character stated, a draft bar, crossed levers pivoted to said draft bar, bars pivotally connected to said crossed levers and extending in pairs, one pair to each side of said draft bar, the ends of a pair of extension bars being in juxtaposition, bow blocks, means for pivotally connecting said bow blocks with the adjacent ends of the respective pairs of extension bars, and bows carried by said bow blocks.

8. In an apparatus of the character stated, a draft bar, crossed levers pivoted to said draft-bar, bars pivotally connected to said crossed levers and extending in pairs, one pair to each side of said draft bar, the ends of a pair of extension bars being in juxtaposition, bow blocks, means for pivotally connecting said bow blocks with the adjacent ends of the respective pairs of extension bars, bows carried by said bow blocks, and means adapted to secure the aforesaid structure to a team.

9. In an apparatus of the character stated, a draft bar, crossed levers pivoted to said draft bar, bars pivotally connected to said crossed levers and extending in pairs, one pair to each side of said draft bar, the ends of a pair of extension bars being in juxtaposition, bow blocks, means for pivotally connecting said bow blocks with the adjacent ends of the respective pairs of extension bars, bows carried by said bow blocks, said crossed levers and said extension bars forming a lazy-tongs connection between said bows, and means for limiting the pivotal movement of said bow blocks with relation to said lazy-tongs connection, together with means adapted to secure the aforesaid structure to a team.

10. In an apparatus of the character stated, a draft bar, crossed levers pivoted to said draft bar, bars pivotally connected to said crossed levers and extending in pairs, one pair to each side of said draft bar, the ends of a pair of extension bars being in juxtaposition, bow blocks, means for pivotally connecting said bow blocks with the adjacent ends of the respective pairs of extension bars, bows carried by said bow blocks, said crossed levers and said extension bars forming a lazy-tongs connection between said bows, means for limiting the pivotal movement of said bow blocks with relation to said lazy-tongs connection, together with means adapted to secure the aforesaid structure to a team, said last named means comprising upper and lower eye members at the extremities of said lazy-tongs connection to receive the yoke and breast straps of a harness, and short tug connecting straps secured to the ends of said bows.

11. In an apparatus of the character stated, a draft bar, crossed levers pivoted to said draft bar, bars pivotally connected to said crossed levers and extending in pairs, one pair to each side of said draft bar, the ends of a pair of extension bars being in juxtaposition, bow blocks, means for pivotally connecting said bow blocks with the adjacent ends of the respective pairs of extension bars, bows carried by said bow blocks, said crossed levers and said extension bars forming a lazy-tongs connection between said bows, means for limiting the pivotal movement of said bow blocks with relation to said lazy-tongs connection, together with means adapted to secure the aforesaid structure to a team, and means for securing said draft bar to the draft tongue of a vehicle.

12. In an apparatus of the character stated, a draft bar, crossed levers pivoted to said draft bar, bars pivotally connected to said crossed levers and extending in pairs, one pair to each side of said draft bar, the ends of a pair of extension bars being in juxtaposition, bow blocks, means for pivotally connecting said bow blocks with the adjacent ends of the respective pairs of extension bars, bows carried by said bow blocks, said crossed levers and said extension bars forming a lazy-tongs connection between said bows, means for limiting the pivotal connection of said bow blocks with relation to said lazy-tongs connection, together with means adapted to secure the aforesaid structure to a team, and means for securing said draft bar to the draft tongue of a vehicle, said draft bar securing means including tongue rings carried at the front end of said draft bar, said draft bar having an eye at its rear end and a releasable finger link connection between the draft tongue and said last named eye.

13. In combination with a team harness of the short tug type, bow members, short tug strap connections between the ends of said bow members and the short tugs of the harness of the respective horse, a draft member, a lazy-tongs connection between said bow members and said draft member, and means arranged to secure the neck yoke straps and the breast straps of the respective harness parts to support said lazy-tongs connection and said bows.

14. In a harness, a draft bar, harness bows adapted to be supported by the horses, a lazy-tongs neck yoke connection between the respective bows and the draft bar, said harness bows comprising two semi-bow members, and means adjustably connecting said members together whereby the space between the same may be increased or diminished, as desired.

15. In combination, harness bows, a draft bar, and a lazy-tongs connection between said bows and bar, said draft bar comprising two members having lapping ends and means for adjustably and pivotally connecting said lapping ends together on a substantially horizontal axis.

FRANK SEARLE.

Witnesses:
H. E. STEFFHENS,
JOHN WALL.